US012767850B2

(12) United States Patent
Nezu et al.

(10) Patent No.: US 12,767,850 B2
(45) Date of Patent: Oct. 20, 2026

(54) SURFACE TREATMENT AGENT

(71) Applicant: TOSOH CORPORATION, Yamaguchi (JP)

(72) Inventors: Yusuke Nezu, Kanagawa (JP); Shinya Imatomi, Kanagawa (JP); Shimou Chinson, Kanagawa (JP); Hiroyuki Ito, Kanagawa (JP)

(73) Assignee: TOSOH CORPORATION, Yamaguchi (JP)

( * ) Notice: Subject to any disclaimer, the term of this patent is extended or adjusted under 35 U.S.C. 154(b) by 520 days.

(21) Appl. No.: 18/284,359

(22) PCT Filed: Mar. 23, 2022

(86) PCT No.: PCT/JP2022/013592
§ 371 (c)(1),
(2) Date: Sep. 27, 2023

(87) PCT Pub. No.: WO2022/210180
PCT Pub. Date: Oct. 6, 2022

(65) Prior Publication Data

US 2024/0158660 A1 May 16, 2024

(30) Foreign Application Priority Data

Mar. 29, 2021 (JP) ................................ 2021-054590
Mar. 29, 2021 (JP) ................................ 2021-054591

(51) Int. Cl.
*C09D 125/08* (2006.01)
*C09D 133/02* (2006.01)

(52) U.S. Cl.
CPC ......... *C09D 125/08* (2013.01); *C09D 133/02* (2013.01)

(58) Field of Classification Search
CPC ...... C09D 133/02; C09D 7/02; C09D 125/08; C09D 133/08; C09D 212/22; C08F 212/08; C08F 212/22; C08F 220/1804; C08K 5/005; C12N 5/0068; C12N 2533/30
See application file for complete search history.

(56) References Cited

U.S. PATENT DOCUMENTS 6,218,492 B1 4/2001 Hill et al.
6,248,811 B1 6/2001 Ottersbach et al.
2013/0280803 A1* 10/2013 Sanyal ................ C12N 5/0602 435/402
2019/0194376 A1 6/2019 Maejima et al.

FOREIGN PATENT DOCUMENTS

EP 4 299 716 A1 1/2024
JP 50-150748 A 12/1975
JP 57-186491 11/1982
JP S 61-132293 6/1986
JP 5-51544 A 3/1993
JP 10-195390 A 7/1998
JP 2007-077383 A 3/2007
JP 2009-173867 A 8/2009
JP 2018-87316 A 6/2018
JP 2018-164412 A 10/2018
JP 2018-174919 11/2018
JP 2020-038059 A 3/2020
JP 2020-110140 A 7/2020

OTHER PUBLICATIONS

Supplementary European Search Report dated Feb. 6, 2025 in European family member application No. 22780395.4.
Charmot D et.al., "Carboxylated styrene-butyl acrylate andstyrene-butadiene emulsion copolymers. Modelling the distribution of the acidmonomer between serum, particle surfaceand the particle core", Retrieved from the Internet:URL:https://pdf.sciencedirectassets.com/271607/1-s2.0-S0032386100X00468/1-s2.0-0032386196003400/main.pdf?hash=67422d91cc4b3cf569ae0a9e7473bac8a009556cd5d1fe1dfc0eaa53be8c2b96&host-68042c943591013ac2b2430a89b270f6af2c76d8dfd086a07176afe7c76c2c61&pii=0032386196003400&tid=spdf-e72d3bb2-9982-4a20-b258-ae331, Nov. 1, 1996, p. 5237-p. 5245, XP093240849.
International Search Report issued Jun. 14, 2022 in International Bureau of WIPO Patent Application No. PCT/JP2022/013592 with an English translation thereof.
Written Opinion issued Jun. 14, 2022 in International Bureau of WIPO Patent Application No. PCT/JP2022/013592 with an English translation thereof. Note: see IPRP (3) below for English language translation of Written Opinion.
International Preliminary Report on Patentability issued Oct. 3, 2023 in International Bureau of WIPO Patent Application No. PCT/JP2022/013592 with an English translation thereof.

* cited by examiner

*Primary Examiner* — Fred M Teskin
(74) *Attorney, Agent, or Firm* — Greenblum & Bernstein, P.L.C.

(57) ABSTRACT

It is possible to provide a surface treatment agent containing a cell-adhesive polymer, by a surface treatment agent obtained by dissolving a water-insoluble polymer compound including constituents of (A) a monomer having a functional group exhibiting acidity and (B) a monomer having a HLB value (a Griffin's method) in a range of 0 to 5.0, in which a ratio of (A) is 10 to 50 mol %, and a solvent is an alcoholic solvent.

10 Claims, No Drawings

SURFACE TREATMENT AGENT

TECHNICAL FIELD

The present invention relates to a surface treatment agent.

BACKGROUND ART

Since biogenetic pharmaceuticals containing cells as a raw material have a high medicinal effect, the spread thereof has been expected, and a technology of culturing the raw material cells in quantity has attracted attention.

In general, cells adhere and proliferate via a biological polymer such as protein, and it is possible to accelerate the adhesion of the cells by treating the surface of a substrate in advance, and as an example, by covering the substrate with protein. In Patent Literature 1, it is disclosed that a culture substrate coated with fibronectin is capable of satisfactorily performing cell proliferation. However, a biological polymer is extremely expensive, and a culture cost of raw material cells increases, which is not preferable for mass culture. Accordingly, a surface treatment agent, which is not derived from the biological polymer and can be manufactured at a low cost, and a culture substrate using the surface treatment agent have been required.

CITATION LIST

Patent Literature

Patent Literature 1: Japanese Unexamined Patent Publication No. S57-186491

SUMMARY OF INVENTION

Technical Problem

An object of the present invention is to provide a surface treatment agent containing a cell-adhesive polymer.

Solution to Problem

As a result of intensive studies of the present inventors in consideration of the problems described above, it has been found that by covering a substrate with a surface treatment agent obtained by dissolving a water-insoluble polymer compound including constituents of (A) a monomer having a functional group exhibiting acidity and (B) a monomer having a HLB value (a Griffin's method) in a range of 0 to 5.0, in which a ratio of (A) is 10 to 50 mol %, and a solvent is an alcoholic solvent, it is possible to impart cell adhesiveness, and the present invention has been completed. That is, the present invention includes the following aspects.

<1> surface treatment agent obtained by dissolving a water-insoluble polymer compound including constituents of (A) and (B) described below, in which a ratio of the constituent (A) is 10 to 50 mol %, and a solvent of the surface treatment agent is an alcoholic solvent;

(A) a monomer having a functional group exhibiting acidity, and (B) a monomer having a HLB value (a Griffin's method) in a range of 0 to 5.0.

<2> The surface treatment agent according to <1>, in which the functional group exhibiting acidity of the constituent (A) is selected from a hydroxy group, a carboxy group, a sulfo group, and a phosphate group.

<3> The surface treatment agent according to <1> or <2>, in which an acidity dissociation constant pKa of the functional group exhibiting acidity of the constituent (A) is −5.0 to 6.0.

<4> The surface treatment agent according to any one of <1> to <3>, in which the constituent (A) is carboxy styrene.

<5> The surface treatment agent according to any one of <1> to <3>, in which the constituent (A) is an acrylic acid.

<6> The surface treatment agent according to any one of <1> to <5>, in which the constituent (B) is styrene.

<7> The surface treatment agent according to any one of <1> to <6>, in which the water-insoluble polymer compound further includes a constituent of (C) described below, and a ratio of the constituent (C) is 10 to 50 mol %;

(C) a monomer having a HLB value (a Griffin's method) in a range of 5.0 to 9.0.

<8> The surface treatment agent according to any one of <1> to <7>, in which a number average molecular weight Mn of the water-insoluble polymer compound is 5000 to 1000000.

<9> The surface treatment agent according to any one of <1> to <8>, in which a concentration of the water-insoluble polymer compound is 0.01 wt % to 10 wt %.

<10> film obtained by applying the surface treatment agent according to any one of <1> to <9> to a substrate.

<11> cell culture substrate having a surface covered with the film according to <10>.

Advantageous Effects of Invention

By covering the culture substrate with the surface treatment agent containing the water-insoluble polymer compound including the constituents of (A) the monomer having a functional group exhibiting acidity and (B) the monomer having a HLB value (a Griffin's method) in a range of 0.0 or more and less than 5.0, in which the ratio of (A) is 10 to 50 mol %, it is possible to impart cell adhesiveness. In particular, compared to a method of imparting the cell adhesiveness to the culture substrate by a biological polymer, it is possible to impart the cell adhesiveness at an extremely low cost, which is extremely effective.

DESCRIPTION OF EMBODIMENTS

Hereinafter, embodiments for carrying out the present invention (hereinafter, simply referred to as "this embodiment") will be described in detail. The embodiments described below are an example for describing the present invention, and is not intended to limit the present invention to the following contents. The present invention can be suitably modified and carried out within the scope of the gist thereof.

A surface treatment agent of the present invention is a surface treatment agent obtained by dissolving a water-insoluble polymer compound including constituents of (A) a monomer having a functional group exhibiting acidity and (B) a monomer having a HLB value (a Griffin's method) in a range of 0 to 5.0, in which a ratio of (A) is 10 to 50 mol %, and a solvent is an alcoholic solvent.

The functional group exhibiting acidity of the constituent (A) of the present invention is a functional group that is ionized in water to exhibit anionicity, is not particularly limited, and as an example, is selected from a hydroxy group, a carboxy group, a sulfo group, and a phosphate group. Among them, the carboxy group is preferable, from the viewpoint of easily controlling the acidity. In addition, two or more of the functional groups may be contained in the monomer, and a functional group other than the functional groups described above, for example, an aldehyde group, a carbonyl group, a nitro group, an amino group, an ether group, an ester group, and an amide group may be contained.

An acidity dissociation constant of this specification indicates an acidity dissociation constant pKa in water. The acidity dissociation constant pKa of this specification is specified from a side-chain structure of a polymer structure. In order to impart cell adhesiveness, it is necessary to accelerate cell-substrate electrostatic bonding, and the acidity dissociation constant pKa of the functional group exhibiting acidity of the constituent (A) of the present invention is not particularly limited, and is −5.0 to 6.0, preferably −3.0 to 5.0, and more preferably 1.0 to 4.5. In a case where the acidity dissociation constant pKa is less than −5.0, copolymerization with the constituent (B) becomes difficult, and in a case where the acidity dissociation constant pKa is greater than 6.0, an accelerative effect of the electrostatic bonding is degraded. As an example of the acidity dissociation constant of the constituent (A) of the present invention, since a side-chain structure of an acrylic acid is —COOH, an acidity constant is 4.76, since a side-chain structure of p-carboxy styrene is $—C_6H_4COOH$, an acidity constant is 4.20, and since a side-chain structure of a p-styrene sulfonic acid is $—C_6H_4SO_3H$, an acidity constant is −2.80.

The structure of the constituent (A) of the present invention is not particularly limited, and examples thereof include an acrylic acid, carboxy styrene (a carboxy group may be at any one of an ortho-position, a meta-position, and a para-position), and a derivative thereof. Among them, the p-carboxy styrene is preferable, from the viewpoint of having a side-chain structure with a more preferred pKa.

In this specification, a HLB value (HLB; hydrophile-lipophile balance) is a value representing the degree of affinity to water and oil, which is described in W. C. Griffin, Journal of the Society of Cosmetic Chemists, 1, 311 (1949). Examples of a method for determining the HLB value by calculation include an Atlas' method, a Griffin's method, a Davies' method, and a Kawakami's method, and in the present invention, a value calculated by the Griffin's method is used, and the value is obtained by the following calculation expression, on the basis of a formula weight of a hydrophilic part in a repeating unit, and the total formula weight of the repeating unit.

HLB Value=20×(Formula Weight of Hydrophilic Part)÷(Total Formula Weight)

In the Griffin's method, the HLB value is a value of 0 to 20, in which hydrophobicity increases as the value becomes closer to 0, and hydrophilicity increases as the value becomes closer to 20. As the definition of the hydrophilic part in the repeating unit described above, a sulfo group part ($—SO_3—$), a phospho group part ($—PO_3—$), a carboxy group part (—COOH), an ester part (—COO—), an amide part (—CONH—), an imide part (—CON—), an aldehyde group part (—CHO), a carbonyl group part (—CO—), a hydroxy group part (—OH), an amino group part ($—NH_2$), an acetyl group part ($—COCH_3$), an ethylene amine part ($—CH_2CH_2N—$), an ethylene oxy part ($—CH_2CH_2O—$), an alkaline metal ion, an alkaline earth metal ion, an ammonium ion, a halide ion, and an acetic acid ion can be exemplified. In the calculation of the hydrophilic part in the repeating unit, it is necessary that atoms configuring the hydrophilic part do not overlap with atoms configuring another hydrophilic part. A calculation example of the HLB value in the repeating unit is described below. For example, in the case of styrene (Molecular Weight: 104.15), since there is no hydrophilic part, and the molecular weight of the hydrophilic part is 0, a HLB value is 0.0. In the case of p-carboxy styrene (Molecular Weight: 148.15), since a hydrophilic part is a carboxy group part, and the molecular weight of the hydrophilic part is 45.02, a HLB value is 6.1. In the case of n-butyl acrylate (Molecular Weight: 128.2), since a hydrophilic part is 1 part of an ester part, and the molecular weight of the hydrophilic part is 44.01, a HLB value is 6.9.

In order to impart the cell adhesiveness, it is necessary to accelerate cell-substrate hydrophobic bonding, and the constituent (B) of the present invention is a monomer having a HLB value in a range of 0.0 to 5.0, and preferably 0.0 to 3.0. In a case where the HLB value is greater than 5, an accelerative effect of the hydrophobic bonding is degraded. By the polymer compound of the present invention including the constituent (B), a cell proliferation rate increases.

The constituent (B) of the present invention is not particularly limited, and examples thereof include styrene, vinyl naphthalene, vinyl anthracene, and a derivative thereof. Among them, the styrene is preferable, from the viewpoint of facilitating copolymerization with the constituent (A).

A ratio 1 of the constituent (A) of the present invention is 10 to 50 mol %. The ratio 1 (mol %) of constituent (A) is the amount of substances of the constituent (A) with respect to the total amount of substances of the constituent (A) and the constituent (B). In a case where the polymer compound includes a constituent (C) described below, a molar ratio A/B (mol/mol) of the constituent (A) to the constituent (B) may be 0.1 to 2.0, and it is preferable that a ratio 2 of the constituent (A) is 10 to 50 mol %. The ratio 2 (mol %) of the constituent (A) is the amount of substances of the constituent (A) with respect to the total amount of substances of the constituent (A), the constituent (B), and the constituent (C). In a case where the ratio 1 and/or the ratio 2 is 10 mol % or more, solubility to an applicable solvent is improved, and in a case where the ratio 1 and/or the ratio 2 is 50 mol % or less, a balance between the cell-substrate electrostatic bonding and the cell-substrate hydrophobic bonding is easily attained, and it is easy to exhibit sufficient cell adhesiveness.

The polymer compound of the present invention is water-insoluble. The water-insolubility in this specification indicates that the dissolved amount of the polymer compound per 100 g of water at 20° C. is 100 mg or less.

In the polymer compound of the present invention, a constituent other than the constituent (A) and the constituent (B) may be included. In addition, the polymer compound may be a random copolymer in which the constituents are randomly arranged, or may be a block copolymer in which polymers respectively including the constituents are connected. Examples of the constituent other than the constituents (A) and (B) include the constituent (C) that is the monomer having a HLB value in a range of 5.0 to 9.0. In a case where the polymer compound of the present invention includes the constituent (C), the polymer compound is easily dissolved in an organic solvent with low invasiveness to the general plastic substrate, and easily imparts the cell adhesiveness even to the plastic substrate. The HLB value of the constituent (C) is preferably 5.0 to 8.0. In a case where the HLB value is less than 5.0, solubility to the organic solvent decreases, and in a case where the HLB value is greater than 9.0, the polymer compound is easily dissolved in water.

The constituent (C) of the present invention is not particularly limited, and examples thereof include acrylic acid ester or methacrylic acid ester. Among them, butyl acrylate is preferable, from the viewpoint of facilitating the copolymerization with the constituent (A) or (B).

The polymer compound of the present invention may include the constituents of (A) the monomer having a functional group exhibiting acidity, (B) the monomer having a HLB value (a Griffin's method) in a range of 0 to 5.0, and (C) the monomer having a HLB value (a Griffin's method) in a range of 5.0 to 9.0, and it is preferable that a ratio of the constituent (C) is 10 to 50 mol %. The ratio (mol %) of the constituent (C) is the amount of substances of the constituent (C) with respect to the total amount of substance of the constituent (A), the constituent (B), and the constituent (C). In a case where the ratio of the constituent (C) is 10 mol % or more, the solubility to the organic solvent is improved, and in a case where the polymer compound is used as the surface treatment agent, coating unevenness is less likely to occur. In a case where the ratio of the constituent (C) is 50 mol % or less, it is easy to exhibit sufficient cell adhesiveness.

A number average molecular weight Mn of the polymer compound of the present invention is not particularly limited, and is 5000 to 1000000, and preferably 10000 to 300000. In a case where the number average molecular weight is less than 5000, the polymer compound is easily dissolved in water, and in a case where the number average molecular weight is greater than 1000000, the solubility to the solvent decreases.

A reaction method of the polymer compound of the present invention is not particularly limited, and as an example, addition polymerization, polycondensation, ionic polymerization, ring-opening polymerization, living radical polymerization, and coordination polymerization can be selected.

A method for manufacturing the polymer compound of the present invention is not particularly limited, and as an example, bulk polymerization, solution condensation, suspension polymerization, and emulsion polymerization can be selected.

The alcoholic solvent of the present invention may be any one of primary alcohol, secondary alcohol, and tertiary alcohol. As the primary alcohol, methanol, ethanol, 1-propanol, 1-butanol, 2-methoxy ethanol, 3-methoxy-1-butanol, and 2-methoxy-1-propanol can be exemplified. As the secondary alcohol, 2-propanol, 2-butanol, 1-methoxy-2-propanol, and 4-methoxy-2-pentanol can be exemplified. As the tertiary alcohol, tert-butyl alcohol and 2-methyl 2-butanol can be exemplified. In particular, in a case where the substrate is a plastic material, it is preferable to select a solvent that has no invasiveness to the substrate, and an alcoholic solvent having an ether group is particularly preferable. Examples of the solvent include 2-methoxy ethanol, 1-methoxy-2-propanol, 2-methoxy-1-propanol, 3-methoxy-1-butanol, and 4-methoxy-2-pentanol. In addition, a mixed liquid containing the alcoholic solvent may be used. The concentration of the polymer compound in the surface treatment agent is not particularly limited, and as an example, is 0.01 to 10 wt %, and preferably 0.1 to 3.0 wt %. In addition, the surface treatment agent of the present invention may contain a compound other than the polymer compound.

The solvent of the present invention may include a solvent other than the alcoholic solvent. As the solvent other than the alcoholic solvent, a solvent in which the substrate to be covered is insoluble is preferable, and acetone, methyl ethyl ketone, diethyl ether, tetrahydrofuran, dimethyl formamide, n-hexane, benzene, toluene, 1,4-dioxane, and the like can be exemplified.

By applying the surface treatment agent of the present invention to the substrate, and removing the solvent with drying or the like, it is possible to mold a film containing the polymer compound of the present invention on the surface of the substrate. The type of substrate is not particularly limited, and examples thereof include polyethylene, polypropylene, polyolefin, an acrylic polymer, a methacrylic acid-based polymer, silicone rubber, polystyrene, polyethylene terephthalate, polycarbonate, a metal, ceramics, and glass. The material of the substrate may be plastic. In addition, the shape of the substrate is not particularly limited, and examples thereof include not only a plate shape, a film shape, a bead shape, and a fiber shape, but also holes, grooves, protrusions, or the like, which are provided on the plate-shaped substrate. A molding method of the film is not particularly limited, and as an example, various generally known methods such as brush coating, dip coating, spin coating, bar coating, flow coating, spray coating, roll coating, air knife coating, and blade coating can be used. A film thickness is not particularly limited, and as an example, is 1 nm to 100 μm.

A substrate having a surface covered with the film of the present invention can be used as a cell culture substrate. The cell that can be applied to the cell culture substrate of the present invention is not particularly limited, and as an example, a mesenchymal stem cell, a Chinese hamster ovary-derived CHO cell, a mouse connective tissue L929 cell, a human embryonic kidney-derived HEK293 cell, a human cervical cancer-derived HeLa cell, an epithelial cell or an endothelial cell configuring each tissue or organ in the body, a skeletal muscle cell, a plain muscle cell, and a cardiac muscle cell exhibiting contractibleness, a neuron cell, a glial cell, and a fibroblastic cell configuring a nerve system, a hepatic parenchymal cell, a hepatic nonparenchymal cell, and a fat cell involved in the metabolism in the body, a stem cell existing in various tissues, as a cell having differentiation potency, a cell induced to be differentiated therefrom, and the like can be used. In addition, a cell included in blood, lymph, cerebrospinal fluid, sputum, and urine or excrement, microorganisms, viruses, and protozoa existing in the body or in the environment, and the like can be exemplified.

EXAMPLES

Hereinafter, Examples of the present invention will be described, but the present invention is not limited to Examples described below. Note that, unless otherwise noted, a commercially available product was used as a reagent.

<Composition of Polymer>

The composition of a polymer was obtained by proton nuclear magnetic resonance ($^1$H-NMR) spectrometry using a nuclear magnetic resonance measuring device (Product Name: JNM-ECZ400S/L1, manufactured by JEOL Ltd.). A measurement sample was prepared by dissolving 15 mg of a copolymer in 0.5 mL of heavy tetrahydrofuran.

<Molecular Weight and Molecular Weight Distribution of Copolymer>

A weight average molecular weight (Mw), a number average molecular weight (Mn), and a molecular weight distribution (Mw/Mn) were measured by gel permeation chromatography (GPC). The measurement was performed by using HLC-8320GPC, manufactured by Tosoh Corporation, as a GPC device, using two TSKgel Super AWM-H, manufactured by Tosoh Corporation, as a column, setting a column temperature to 40° C., and using a dimethyl formamide solution containing 10 mM of lithium bromide and 10 mM of phosphate, as an eluent. The measurement was performed by preparing a measurement sample at 1.0 mg/mL. As a molecular weight calibration curve, polystyrene (PStquick MP-M, manufactured by Tosoh Corporation) with a known molecular weight was used.

<Measurement of Number of Cells and Cell Viability>

10 μL of a cell suspension was added to a slide for measuring the number of cells (Product Name: Countess Cell Counting Chamber Slid, manufactured by Thermo Fisher Scientific Inc.), and the number of cells was measured by using an automatic cell counter (Product Name: Countess® II, manufactured by Thermo Fisher Scientific Inc.).

Example 1

0.741 g (5 mmol) of p-carboxy styrene (CSt, pKa=4.20) as the constituent (A) and 1.562 g (15 mmol) of styrene (St, HLB Value=0) as the constituent (B) were added to 100 mL of a two-neck flask, 3.3 mg (20 μmol) of azobisisobutyronitrile and 20 mL of tert-butyl alcohol were further added thereto, and beating and stirring were performed at 64° C. for 24 hours after nitrogen gas replacement. A reaction liquid was subjected to reprecipitation and purification with n-heptane, and was vacuum-dried to obtain 0.5 g of a white solid polymer compound 1 poly(CSt/St). In the obtained polymer compound 1, a composition was CSt:St=41:59 (mol %), a number average molecular weight Mn was $11.6\times10^5$, and a molecular weight distribution Mw/Mn was 1.88.

0.050 g of the polymer compound 1 was weighed, and was dissolved in 9.950 g of 2-methoxy-1-propanol to obtain a surface treatment agent 1. 100 μL of the surface treatment agent 1 was dropped onto a polystyrene dish for IWAKI suspension culture with a diameter of 60 mm, and was subjected to spin coating at 3000 rpm for 60 seconds to prepare a cell culture substrate 1 covered with the polymer compound 1. $1.0\times10^5$ cells of human bone marrow-derived mesenchymal stem cells (Product Code: PT-2501, manufactured by Lonza K.K.) were seeded on the cell culture substrate 1, and were cultured at 37° C. and a $CO_2$ concentration of 5%. As a culture liquid, a Dulbecco modified Eagle's minimal essential medium (10 vol % FBS/DMEM) containing 10 vol % of fetal bovine serum (produced in Colombia) was used. After culture for 6 days, the cells were peeled off from the substrate by using trypsin, and the number of cells was measured to be $3.0\times10^5$ cells.

Example 2

1.156 g (8 mmol) of p-carboxy styrene (CSt, pKa=4.20) as the constituent (A) and 1.271 g (12 mmol) of styrene (St, HLB Value=0) as the constituent (B) were added to 100 mL of a two-neck flask, 3.3 mg (20 μmol) of azobisisobutyronitrile and 20 mL of tert-butyl alcohol were further added thereto, and beating and stirring were performed at 64° C. for 24 hours after nitrogen gas replacement. By performing purification with the same method as that in Example 1, 0.92 g of a polymer compound 2 poly(CSt/St) was obtained. In the obtained polymer compound 2, a composition was CSt:St=33:67 (mol %), a number average molecular weight Mn was $10.6\times10^4$, and a molecular weight distribution Mw/Mn was 1.84.

A cell culture substrate 2 was prepared by the same method as that in Example 1, except that the polymer compound 2 was used, and human bone marrow-derived mesenchymal stem cells were cultured. After culture for 6 days, the cells were peeled off from the substrate by using trypsin, and the number of cells was measured to be $3.6\times10^5$ cells.

Example 3

0.296 g (2 mmol) of p-carboxy styrene (CSt, pKa=4.20) as the constituent (A) and 1.875 g (18 mmol) of styrene (St, HLB Value=0) as the constituent (B) were added to 100 mL of a two-neck flask, 3.3 mg (20 μmol) of azobisisobutyronitrile and 20 mL of tert-butyl alcohol were further added thereto, and heating and stirring were performed at 64° C. for 24 hours after nitrogen gas replacement. By performing purification with the same method as that in Example 1, 0.6 g of a polymer compound 3 poly(CSt/St) was obtained. In the obtained polymer compound 3, a composition was CSt:St=20:80 (mol %), a number average molecular weight Mn was $6.0\times10^4$, and a molecular weight distribution Mw/Mn was 1.81.

A cell culture substrate 3 was prepared by the same method as that in Example 1, except that the polymer compound 3 was used, and human bone marrow-derived mesenchymal stem cells were cultured. After culture for 6 days, the cells were peeled off from the substrate by using trypsin, and the number of cells was measured to be $3.7\times10^5$ cells.

Example 4

0.721 g (10 mmol) of an acrylic acid (AA, pKa=4.76) as the constituent (A) and 1.282 g (10 mmol) of styrene (St, HLB Value=0) as the constituent (B) were added to 100 mL of a two-neck flask, 3.3 mg (20 μmol) of azobisisobutyronitrile and 20 mL of tert-butyl alcohol were further added thereto, and heating and stirring were performed at 64° C. for 24 hours after nitrogen gas replacement. By performing purification with the same method as that in Example 1, 0.8 g of a polymer compound 4 poly(AA/St) was obtained. In the obtained polymer compound 4, a composition was AA:St=39:61 (mol %), a number average molecular weight Mn was $5.8\times10^4$, and a molecular weight distribution Mw/Mn was 1.88.

A cell culture substrate 4 was prepared by the same method as that in Example 1, except that the polymer compound 4 was used, and human bone marrow-derived mesenchymal stem cells were cultured. After culture for 6 days, the cells were peeled off from the substrate by using trypsin, and the number of cells was measured to be $2.9\times10^5$ cells.

Example 5

0.889 g (6 mmol) of carboxy styrene (CSt, pKa=4.20) as the constituent (A), 0.833 g (8 mmol) of styrene (St, HLB Value=0) as the constituent (B), and 0.769 g (6 mmol) of butyl acrylate (BA, HLB Value=6.9) as the constituent (C) were added to 200 mL of a two-neck flask, 16 mg (100 μmol) of azobisisobutyronitrile and 20 mL of tert-butyl alcohol were further added thereto, and heating and stirring were performed at 64° C. for 24 hours after nitrogen gas replacement. A reaction liquid was subjected to reprecipitation and purification with n-heptane, and was vacuum-dried to obtain 1.288 g of a white solid polymer compound 5 poly(CSt/St/BA). In the obtained polymer compound 5, a composition was CSt:St:BA=28:49:23 (mol %), a molar ratio A/B was 0.57, a number average molecular weight Mn was $9.1\times10^4$, and a molecular weight distribution Mw/Mn was 1.90.

0.05 g of the polymer compound 5 was weighed, and was dissolved in 9.95 g of 2-butanol. 100 μL of this solution was dropped onto a polystyrene dish for IWAKI suspension culture of 60 mm, and was subjected to spin coating at 3000 rpm for 60 seconds to prepare a cell culture substrate 5 covered with the polymer compound 5. Human bone marrow-derived mesenchymal stem cells were cultured by the same method as that in Example 1, except that the cell culture substrate 5 was used. After culture for 6 days, the number of cells was measured to be $4.0\times10^5$ cells.

Example 6

0.889 g (6 mmol) of carboxy styrene (CSt, pKa=4.20) as the constituent (A), 0.625 g (6 mmol) of styrene (St, HLB Value=0) as the constituent (B), and 1.282 g (10 mmol) of butyl acrylate (BA, HLB Value=6.9) as the constituent (C) were added to 200 mL of a two-neck flask, 16 mg (100 μmol) of azobisisobutyronitrile and 20 mL of tert-butyl alcohol were further added thereto, and heating and stirring were performed at 64° C. for 24 hours after nitrogen gas replacement. A reaction liquid was subjected to reprecipitation and purification with n-heptane, and was vacuum-dried to obtain 1.128 g of a white solid polymer compound 6 poly(CSt/St/BA). In the obtained polymer compound 6, a composition was CSt:St:BA=25:29:46 (mol %), a molar ratio A/B was 0.86, a number average molecular weight Mn was $9.4\times10^4$, and a molecular weight distribution Mw/Mn was 1.9.

A cell culture substrate was prepared by the same method as that in Example 5, except that the polymer compound 6 was used, and human bone marrow-derived mesenchymal stem cells were cultured. After culture for 6 days, the number of cells was measured to be $3.6\times10^5$ cells.

Example 7

0.593 g (4 mmol) of carboxy styrene (CSt, pKa=4.20) as the constituent (A), 0.729 g (7 mmol) of styrene (St, HLB Value=0) as the constituent (B), and 0.385 g (3 mmol) of butyl acrylate (BA, HLB Value=6.9) as the constituent (C) were added to 200 mL of a two-neck flask, 16 mg (100 μmol) of azobisisobutyronitrile and 20 mL of tert-butyl alcohol were further added thereto, and heating and stirring were performed at 64° C. for 24 hours after nitrogen gas replacement. A reaction liquid was subjected to reprecipitation and purification with n-heptane, and was vacuum-dried to obtain 1.089 g of a white solid polymer compound 7 poly(CSt/St/BA). In the obtained polymer compound 7, a composition was CSt:St:BA=31:51:18 (mol %), a molar ratio A/B was 0.61, a number average molecular weight Mn was $9.0\times10^4$, and a molecular weight distribution Mw/Mn was 1.9.

A cell culture substrate was prepared by the same method as that in Example 5, except that the polymer compound 7 was used, and human bone marrow-derived mesenchymal stem cells were cultured. After culture for 6 days, the number of cells was measured to be $3.4\times10^5$ cells.

Comparative Example 1

$1.0\times10^5$ cells of human bone marrow-derived mesenchymal stem cells (Product Code: PT-2501, manufactured by Lonza K.K.) were seeded on a polystyrene dish for IWAKI suspension culture of 60 mm, and were cultured at 37° C. and a $CO_2$ concentration of 5%. As a culture liquid, a Dulbecco modified Eagle's minimal essential medium (10 vol % FBS/DMEM) containing 10 vol % of fetal bovine serum (produced in Colombia) was used. After culture for 6 days, the cells were peeled off from the substrate by using trypsin, and the number of cells was measured to be $1.9\times10^5$ cells.

Comparative Example 2

2.222 g (15 mmol) of p-carboxy styrene (CSt, pKa=4.20) as the constituent (A) and 0.521 g (5 mmol) of styrene (St, HLB Value=0) as the constituent (B) were added to 100 mL of a two-neck flask, 3.3 mg (20 μmol) of azobisisobutyronitrile and 20 mL of tert-butyl alcohol were further added thereto, and heating and stirring were performed at 64° C. for 24 hours after nitrogen gas replacement. By performing purification with the same method as that in Example 1, 1.4 g of a polymer compound 8 poly(CSt/St) was obtained. In the obtained polymer compound 8, a composition was CSt:St=85:15 (mol %), a number average molecular weight Mn was $8.4\times10^4$, and a molecular weight distribution Mw/Mn was 2.31.

A cell culture substrate 8 was prepared by the same method as that in Example 1, except that the polymer compound 8 was used, and human bone marrow-derived mesenchymal stem cells were cultured. After culture for 6 days, the cells were peeled off from the substrate by using trypsin, and the number of cells was measured to be $1.1\times10^5$ cells.

Comparative Example 3

1.185 g (8 mmol) of p-carboxy styrene (CSt, pKa=4.20) as the constituent (A) and 1.538 g (12 mmol) of n-butyl acrylate (BA, HLB Value=6.9) as a substitute of the constituent (B) were added to 100 mL of a two-neck flask, 3.3 mg (20 μmol) of azobisisobutyronitrile and 10 mL of tert-butyl alcohol were further added thereto, and heating and stirring were performed at 64° C. for 24 hours after nitrogen gas replacement. By performing purification with the same method as that in Example 1, 0.9 g of a polymer compound 9 poly(CSt/BA) was obtained. In the obtained polymer compound 9, a composition was CSt:BA=41:59 (mol %), a number average molecular weight Mn was $9.4\times10^4$, and a molecular weight distribution Mw/Mn was 2.19.

A cell culture substrate 9 was prepared by the same method as that in Example 1, except that the polymer compound 9 was used, and human bone marrow-derived mesenchymal stem cells were cultured. After culture for 6 days, the cells were peeled off from the substrate by using trypsin, and the number of cells was measured to be $1.5\times10^5$ cells.

Comparative Example 4

1.042 g (10 mmol) of styrene (St, HLB Value=0) as the constituent (B) and 1.282 g (10 mmol) of n-butyl acrylate (BA, HLB Value=6.9) were added to 100 mL of a two-neck flask, 3.3 mg (20 μmol) of azobisisobutyronitrile and 10 mL of tert-butyl alcohol were further added thereto, and heating and stirring were performed at 64° C. for 24 hours after nitrogen gas replacement. By performing purification with the same method as that in Example 1, 0.7 g of a polymer compound 10 poly(BA/St) was obtained. In the obtained polymer compound 10, a composition was St:BA=60:40 (mol %), a number average molecular weight Mn was $7.6\times10^4$, and a molecular weight distribution Mw/Mn was 2.26.

A cell culture substrate 7 was prepared by the same method as that in Example 1, except that the polymer compound 10 was used, and human bone marrow-derived mesenchymal stem cells were cultured. After culture for 6 days, the cells were peeled off from the substrate by using trypsin, and the number of cells was measured to be $2.1\times10^5$ cells.

Comparative Example 5

2.371 g (16 mmol) of carboxy styrene (CSt, pKa=4.20) as the constituent (A), 0.417 g (4 mmol) of styrene (St, HLB Value=0) as the constituent (B), and 0.769 g (6 mmol) of butyl acrylate (BA, HLB Value=6.9) as the constituent (C) were added to 200 mL of a two-neck flask, 16 mg (100 μmol) of azobisisobutyronitrile and 20 mL of tert-butyl alcohol were further added thereto, and heating and stirring were performed at 64° C. for 24 hours after nitrogen gas replacement. A reaction liquid was subjected to reprecipitation and purification with n-heptane, and was vacuum-dried to obtain 1.224 g of a white solid polymer compound 11 poly(CSt/St/BA). In the obtained polymer compound 11, a composition was CSt:St:BA=79:7:14 (mol %), a molar ratio A/B was 11.29, a number average molecular weight Mn was $9.4\times10^4$, and a molecular weight distribution Mw/Mn was 1.9.

A cell culture substrate was prepared by the same method as that in Example 5, except that the polymer compound 11 was used, and human bone marrow-derived mesenchymal stem cells were cultured. After culture for 6 days, the number of cells was measured to be $1.2\times10^5$ cells.

Comparative Example 6

1.458 g (14 mmol) of styrene (St, HLB Value=0) as the constituent (B) and 0.769 g (6 mmol) of butyl acrylate (BA, HLB Value=6.9) as the constituent (C) were added to 200 mL of a two-neck flask, 16 mg (100 μmol) of azobisisobutyronitrile and 20 mL of tert-butyl alcohol were further added thereto, and heating and stirring were performed at 64° C. for 24 hours after nitrogen gas replacement. By performing purification with the same method as that in Example 5, 1.215 g of a polymer compound 12 poly(St/BA) was obtained. In the obtained polymer compound 12, a composition was St:BA=60:40 (mol %), a molar ratio A/B was 0.0, a number average molecular weight Mn was $8.3\times10^4$, and a molecular weight distribution Mw/Mn was 2.0.

A cell culture substrate was prepared by the same method as that in Example 5, except that the polymer compound 12 was used, and human bone marrow-derived mesenchymal stem cells were cultured. After culture for 6 days, the number of cells was measured to be $2.3\times10^5$ cells.

Comparative Example 7

2.222 g (15 mmol) of carboxy styrene (CSt, pKa=4.20) as the constituent (A) and 0.521 g (5 mmol) of styrene (St, HLB Value=0) as the constituent (B) were added to 200 mL of a two-neck flask, 16 mg (100 μmol) of azobisisobutyronitrile and 20 mL of tert-butyl alcohol were further added thereto, and heating and stirring were performed at 64° C. for 24 hours after nitrogen gas replacement. A reaction liquid was subjected to reprecipitation and purification with n-heptane, and was vacuum-dried to obtain 1.530 g of a white solid polymer compound 13 poly(CSt/St). In the obtained polymer compound 13, a composition was CSt:St=80:20 (mol %), a molar ratio A/B was 4.00, a number average molecular weight Mn was $8.9\times10^4$, and a molecular weight distribution Mw/Mn was 1.9.

0.05 g of the polymer compound 13 was weighed, and was attempted to be dissolved in 9.95 g 2-butanol, but was not capable of being dissolved. 100 μL of this suspension was dropped onto a polystyrene dish for IWAKI suspension culture of 60 mm, and was subjected to spin coating at 3000 rpm for 60 seconds, but coating unevenness was observed on the surface of the culture substrate, and even coating was not capable of being performed. Human bone marrow-derived mesenchymal stem cells were cultured by the same method as that in Example 5, except that this cell culture substrate was used. After culture for 6 days, the number of cells was measured to be $3.7\times10^5$ cells.

Comparative Example 8

$1.0\times10^5$ cells of human bone marrow-derived mesenchymal stem cells (Product Code: PT-2501, manufactured by Lonza K.K.) were seeded on a polystyrene dish for IWAKI suspension culture of 60 mm, and were cultured at 37° C. and a $CO_2$ concentration of 5%. As a culture liquid, a Dulbecco modified Eagle's minimal essential medium (10 vol % FBS/DMEM) containing 10 vol % of fetal bovine serum (produced in Colombia) was used. After culture for 6 days, the number of cells was measured to be $2.0\times10^5$ cells.

Comparative Example 9

$1.0\times10^5$ cells of human bone marrow-derived mesenchymal stem cells (Product Code: PT-2501, manufactured by Lonza K.K.) were seeded on a polystyrene dish for IWAKI adhesion culture of 60 mm, and were cultured at 37° C. and a $CO_2$ concentration of 5%. As a culture liquid, a Dulbecco modified Eagle's minimal essential medium (10 vol % FBS/DMEM) containing 10 vol % of fetal bovine serum (produced in Colombia) was used. After culture for 6 days, the number of cells was measured to be $3.0\times10^5$ cells.

In Examples 1 to 6 and Comparative Examples 2 to 7, the film of the polymer compound was colorless and transparent, except for Comparative Example 7.

TABLE 1

| | Polymer compound | | | | | | | | Applicable solvent | | Cell culture result Number of cells |
|---|---|---|---|---|---|---|---|---|---|---|---|
| | Constituent A | | Constituent B | | Constituent C | | Mn | Composition ratio [mol %] | 2-Methoxy ethanol | 2-Butanol | |
| | | pKa | | HLB | | HLB | [$\times10^4$] | A:B:C | | | [$\times10^5$ cells] |
| Example 1 | p-Carboxy styrene | 4.20 | Styrene | 0.0 | — | — | 11.6 | 41:59:0 | Available | Unavailable | 3.0 |

TABLE 1-continued

| | Polymer compound | | | | | | | | | | Cell culture result Number of cells |
|---|---|---|---|---|---|---|---|---|---|---|---|
| | | | | | | | | Composition ratio | Applicable solvent | | |
| | Constituent A | | Constituent B | | Constituent C | | Mn | [mol %] | 2-Methoxy | | |
| | | pKa | | HLB | | HLB | [×10$^4$] | A:B:C | ethanol | 2-Butanol | [×10$^5$ cells] |
| Example 2 | p-Carboxy Styrene | 4.20 | Styrene | 0.0 | — | — | 10.6 | 33:67:0 | Available | Unavailable | 3.6 |
| Example 3 | p-Carboxy styrene | 4.20 | Styrene | 0.0 | — | — | 6.0 | 20:80:0 | Available | Unavailable | 3.7 |
| Example 4 | Acrylic acid | 4.76 | Styrene | 0.0 | — | — | 5.8 | 39:61:0 | Available | Unavailable | 2.9 |
| Example 5 | p-Carboxy styrene | 4.20 | Styrene | 0.0 | Butyl acrylate | 6.9 | 9.1 | 28:49:23 | Available | Available | 4.0 |
| Example 6 | p-Carboxy styrene | 4.20 | Styrene | 0.0 | Butyl acrylate | 6.9 | 9.4 | 25:29:46 | Available | Available | 3.6 |
| Example 7 | p-Carboxy styrene | 4.20 | Styrene | 0.0 | Butyl acrylate | 6.9 | 9.0 | 31:51:18 | Available | Available | 3.4 |
| Comparative Example 1 | — | — | — | — | — | — | — | — | — | — | 1.9 |
| Comparative Example 2 | p-Carboxy styrene | 4.20 | Styrene | 0.0 | — | — | 8.4 | 85:15:0 | Available | Unavailable | 1.1 |
| Comparative Example 3 | p-Carboxy styrene | 4.20 | — | — | Butyl acrylate | 6.9 | 9.4 | 41:0:59 | Available | Available | 1.5 |
| Comparative Example 4 | — | — | Styrene | 0.0 | Butyl acrylate | 6.9 | 7.6 | 0:60:40 | Available | Available | 2.1 |
| Comparative Example 5 | p-Carboxy styrene | 4.20 | Styrene | 0.0 | Butyl acrylate | 6.9 | 9.4 | 79:7:14 | Available | Available | 1.2 |
| Comparative Example 6 | — | 4.20 | Styrene | 0.0 | Butyl acrylate | 6.9 | 8.3 | 0:60:40 | Available | Available | 2.3 |
| Comparative Example 7 | p-Carboxy styrene | 4.20 | Styrene | 0.0 | Butyl acrylate | 6.9 | 8.9 | 80:20:0 | Available | Available | 3.7 |
| Comparative Example 8 | — | — | — | — | — | — | — | — | — | — | 2.0 |
| Comparative Example 9 | — | — | — | — | — | — | — | — | — | — | 3.0 |

The invention claimed is:

1. A surface treatment agent obtained by dissolving a water-insoluble polymer compound including constituents of (A) and (B) described below, wherein a ratio of the constituent (A) is 10 to 50 mol %, and a solvent of the surface treatment agent is an alcoholic solvent;

(A) a monomer having a functional group exhibiting acidity, wherein the constituent (A) is carboxy styrene, and (B) a monomer having a hydrophile-lipophile balance (HLB) value (Griffin's method) in a range of 0 to 5.0.

2. The surface treatment agent according to claim 1, wherein the functional group exhibiting acidity of the constituent (A) is selected from a hydroxy group, a carboxy group, a sulfo group, and a phosphate group.

3. The surface treatment agent according to claim 1, wherein an acidity dissociation constant pKa of the functional group exhibiting acidity of the constituent (A) is −5.0 to 6.0.

4. The surface treatment agent according to claim 1, wherein the constituent (A) is an acrylic acid.

5. The surface treatment agent according to claim 1, wherein the constituent (B) is styrene.

6. The surface treatment agent according to claim 1, wherein the water-insoluble polymer compound further includes a constituent of (C) described below, and a ratio of the constituent (C) is 10 to 50 mol %;

(C) a monomer having a hydrophile-lipophile balance (HLB) value (Griffin's method) in a range of 5.0 to 9.0.

7. The surface treatment agent according to claim 1, wherein a number average molecular weight Mn of the water-insoluble polymer compound is 5000 to 1000000.

8. The surface treatment agent according to claim 1, wherein a concentration of the water-insoluble polymer compound is 0.01 wt % to 10 wt %.

9. A film obtained by applying the surface treatment agent according to claim 1 to a substrate.

10. A cell culture substrate having a surface covered with the film according to claim 9.

* * * * *